Feb. 18, 1941.    H. E. ALDRICH    2,232,585
AUTOMOBILE WHEEL SUPPORT
Filed May 1, 1940
FIG. 1.
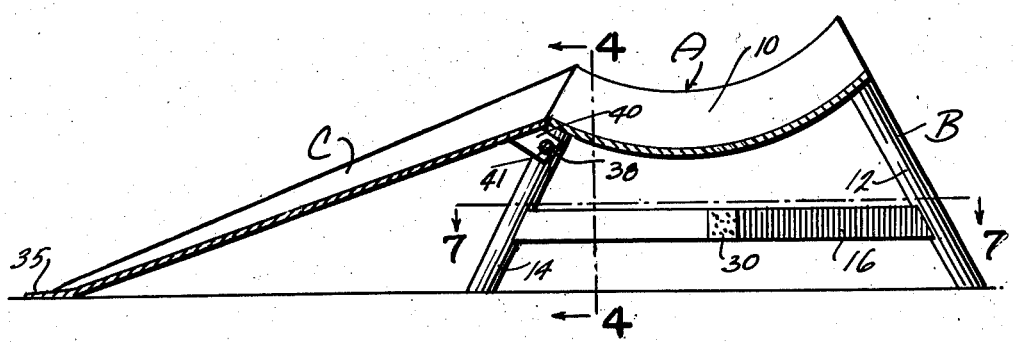
FIG. 2.   FIG. 3.   FIG. 4.
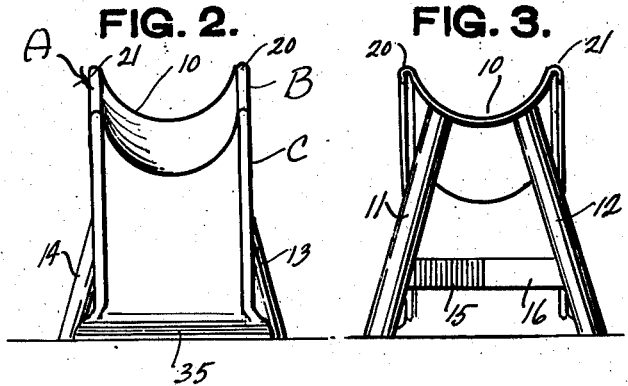   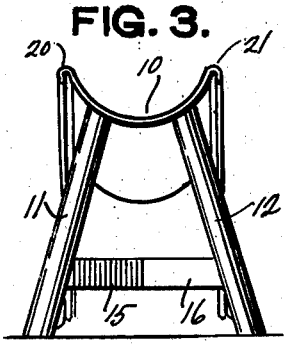   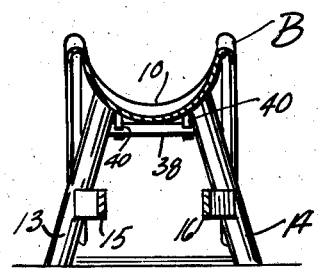
FIG. 5.
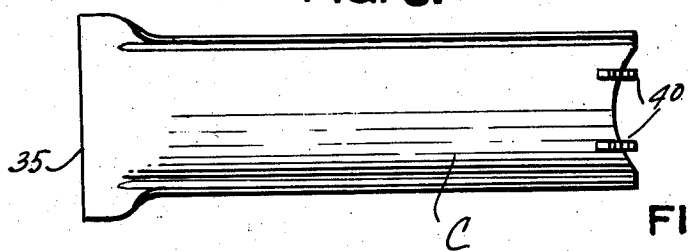
FIG. 6.   FIG. 7.
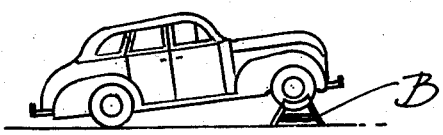   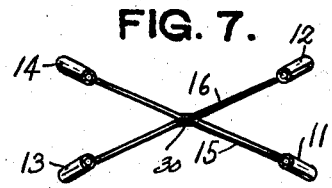
INVENTOR.
Homer E. Aldrich
BY
ATTORNEYS Patented Feb. 18, 1941

2,232,585

UNITED STATES PATENT OFFICE 2,232,585

AUTOMOBILE WHEEL SUPPORT

Homer Eugene Aldrich, Anderson, S. C.

Application May 1, 1940, Serial No. 332,851

3 Claims. (Cl. 254—88)

This invention relates to improvements in automobile wheel supports whereby to support the rear or front end of an automobile.

The primary object of the invention is the provision of a preferably welded steel automobile wheel support, individual to each wheel of an automobile, having relatively detachable platform and runway parts which will permit of the front, rear or all the wheels of an automobile to rest in the platform portions whereby to support the automobile in an elevated position, with the space below the automobile entirely unencumbered except immediately below the wheels which rest upon the platform portions.

Other objects and advantages of the invention will be apparent during the course of the following detailed description.

In the accompanying drawing, wherein for the purpose of illustration is shown only a preferred embodiment of the invention—

Figure 1 is a vertical sectional view taken longitudinally thru the improved automobile stand or support, showing the runway and platform portions attached.

Figure 2 is a front elevation from the runway side of the improved support.

Figure 3 is a rear elevation of the improved device.

Figure 4 is a vertical sectional view taken substantially on the line 4—4 of Figure 1.

Figure 5 is a bottom plan view of the runway portion of the device.

Figure 6 shows how the front wheels of an automobile may be supported in an unencumbered relation by means of the platform portions of the device.

Figure 7 is a sectional view taken substantially on the line 7—7 of Figure 1.

In the drawing, wherein similar reference characters designate corresponding parts thruout the several views, the letter A may generally designate the improved device, which may consist of a platform portion B and a runway portion C.

It is preferred that all parts of the improved device may be made of steel; the different parts such as legs, braces, etc. being welded together in an economical relationship, altho I do not wish to be limited to such arrangement.

The platform portion B includes the table portion 10 in which the wheel rests; rear supporting legs 11 and 12; front legs 13 and 14, and leg braces 15 and 16.

The sheet metal table 10 is concavo-convex in cross section, the socket thereof being adapted to receive the tire of the wheel. The side marginal portions 20 and 21 of this supporting table 10 are rolled in concavo-convex form, with the convex side facing the same direction as the wheel receiving concavity of the table. This concavo-convex beading of the side marginal portions of the table materially strengthens the device. If desired, the longitudinal central part of the table 10 may be straight in cross section for a distance.

The rear legs 11 and 12 are preferably of tubular material and welded to the under or convex surface of the table portion 10. They extend divergently downward. Similarly, the front legs 13 and 14 are welded at their upper ends to the convex side of the table portion 10 and in the same relationship they extend divergently downward. The rear legs are longer than the front legs so that the table 10 at its rear end is higher than at the runway attaching end of the platform.

As shown in Figure 7 of the drawing, the cross braces 15 and 16 consist of V-shaped pieces, the ends of which are welded to the front and rear legs; the members 15 and 16 being welded together at the apices, designated at 30 in Figures 1 and 7 of the drawing. With this arrangement, the legs are very effectively braced by means of a construction which is economical to produce. The fact that separate legs are provided enables the device to rest rather evenly, notwithstanding the uneven contour of the garage floor, which is usually of concrete and has irregularities therein.

The runway C is of metal. In cross section, it is of the same contour as the table portion 10 of the platform being concavo-convex and having rolled side margins which are convex as to their upward facing. At the lower end 35 the runway is flattened; including both a continuation of the concavo-convex treadway and the side marginal portions. This end 35 preferably also lies flat on the ground for a distance that enables the wheel to better enter the concavity or socket of the runway.

Novel means is provided for attaching the runway and platform sections together. This includes the provision of a cross rod or bar 38, which is welded at its ends to the front legs 13 and 14 of the platform section, immediately below the table 10, as shown in Figures 1 and 4 of the drawing. The runway section C is provided with a complementary means for engaging the bar 38, in the nature of lugs 40, which are welded to the under or convex surface of the platform runway C immediately at the rear end of this runway; these lugs 40 providing sockets 41 which detachably receive the rod or bar 38 therein. The lugs 40 are of general U-shaped formation, and extend beyond the rear edge of the runway proper, for easy attachment upon the rod 38.

When the runway C is attached to the platform section B, the rear edge of the platform section and the front edge of the table portion 10 of the platform section meet and engage.

In use, the devices, including both the platform and runway sections are placed a proper distance apart, and the wheels of the car are run upward upon the runway sections and come to rest in the sockets of the platform table portions 10. The runways may then be removed. It is thus apparent that only the portion of the automobile immediately beneath the tire or wheel is encumbered, and space is left beneath the car and all around the wheel for access to parts of the automobile.

Various changes may be made in the shape, size and arrangement of parts herein shown and described, without departing from the spirit of the invention or the scope of the following claims.

I claim:

1. A metal supporting stand for receiving a single wheel of an automobile whereby to support that wheel, comprising a socketed supporting table of sheet metal which is concavo convex both longitudinally and transversely, shaped to the contour of an automobile wheel tire, supporting means connected with the sheet metal table for holding it in an elevated position with the rear end of its socket at a higher elevation than the fore end, and a runway at the fore end of the table portion inclined therefrom and upon which the wheel of the automobile is adapted to ride to an elevated position in the socket of the table portion.

2. A metal supporting stand for receiving a single wheel of an automobile whereby to support that wheel, comprising a socketed supporting table of sheet metal which is concavo convex both longitudinally and transversely, shaped to the contour of an automobile wheel tire, supporting means connected with the sheet metal table for holding it in an elevated position with the rear end of its socket at a higher elevation than the fore end, and a runway at the fore end of the table portion inclined therefrom and upon which the wheel of the automobile is adapted to ride to an elevated position in the socket of the table portion, said runway portion being of sheet metal having a concavo convex cross section to provide a trough in which the tire of the wheel is adapted to fit as it rides into position in the socket of the table, the cross section of the runway at its connection with the table being such as to merge into accurate alignment with the concavo cross section at the fore end of the table, and at its lower other end the runway portion's cross section being gradually reduced to substantially a flattened entrance end.

3. A device for elevating the wheels of an automobile comprising an elevated platform section of sheet metal which will occupy only the space immediately below a single wheel of the automobile which it receives, said platform section being concavo-convex in cross section and longitudinally arcuated concavo-convexly for rather snugly receiving the lower portion of the tread of an automobile tire, the wheel of which is resting upon the platform section, and a runway section inclined from an end of the platform section, the same being of concavo-convex cross section and having a flattened entrance portion adapted to rest upon a ground or floor surface and therefrom the cavity provided by the concavo-convex cross section gradually increasing in depth to the point where the runway section connects with the platform section.

HOMER EUGENE ALDRICH.